(No Model.)  3 Sheets—Sheet 1.

G. W. STAFFORD.
Shedding Engine for Looms.

No. 236,374. Patented Jan. 4, 1881.

Witnesses.
Edward O. Brown.
Hermann Otto.

Inventor:
George W. Stafford.

(No Model.)  3 Sheets—Sheet 3.

G. W. STAFFORD.
Shedding Engine for Looms.

No. 236,374.  Patented Jan. 4, 1881.

Witnesses.
F. J. Simpson.
H. E. Lodge.

Inventor.
George W. Stafford.
by W. H. Babcock
Attorney

UNITED STATES PATENT OFFICE.

GEORGE W. STAFFORD, OF LAWRENCE, MASSACHUSETTS.

SHEDDING-ENGINE FOR LOOMS.

SPECIFICATION forming part of Letters Patent No. 236,374, dated January 4, 1881.

Application filed June 29, 1880. (No model.)

*To all whom it may concern:*

Be it known that I, GEORGE W. STAFFORD, a citizen of the United States, residing at Lawrence, in the county of Essex and State of Massachusetts, have invented certain new and useful Improvements in Shedding-Engines for Looms; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of shedding-engines in which two sets or series of hooks are lifted alternately by their respective levers, the particular hook or hooks to be thus lifted at each motion of its or their lever being determined by the action of a pattern-cylinder upon a series of needles, each of which has two loops formed in it, one loop to receive a hook of one series and the other loop to receive a hook of the other series.

The said invention consists in providing the lower ends of said hooks with loops formed therein, and the combination, with said hooks, of rods passed through said loops (one rod to each series of hooks) and springs which force said rods downward, all constructed and operating substantially as and for the purposes set forth.

Figure 1:
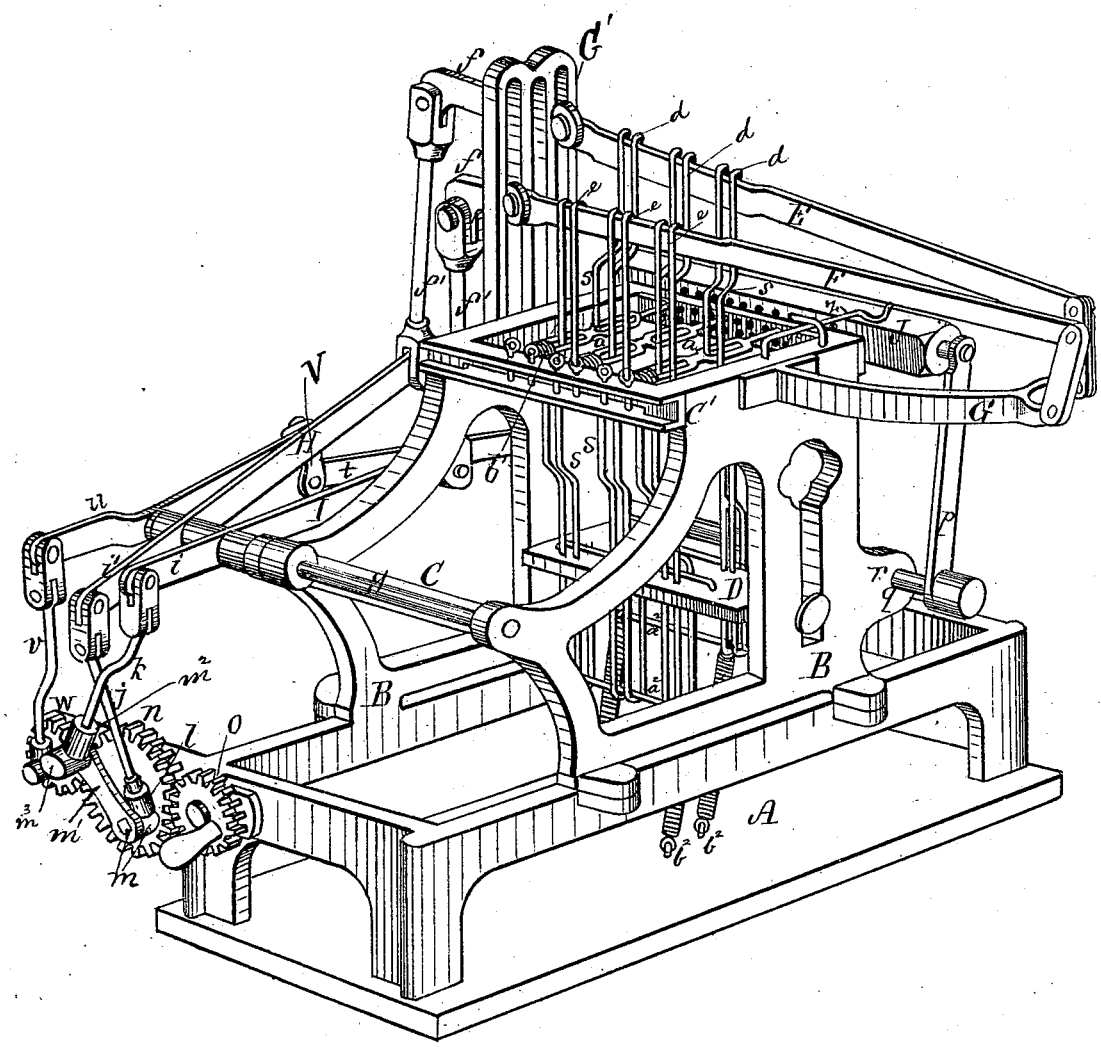
Figure 2:
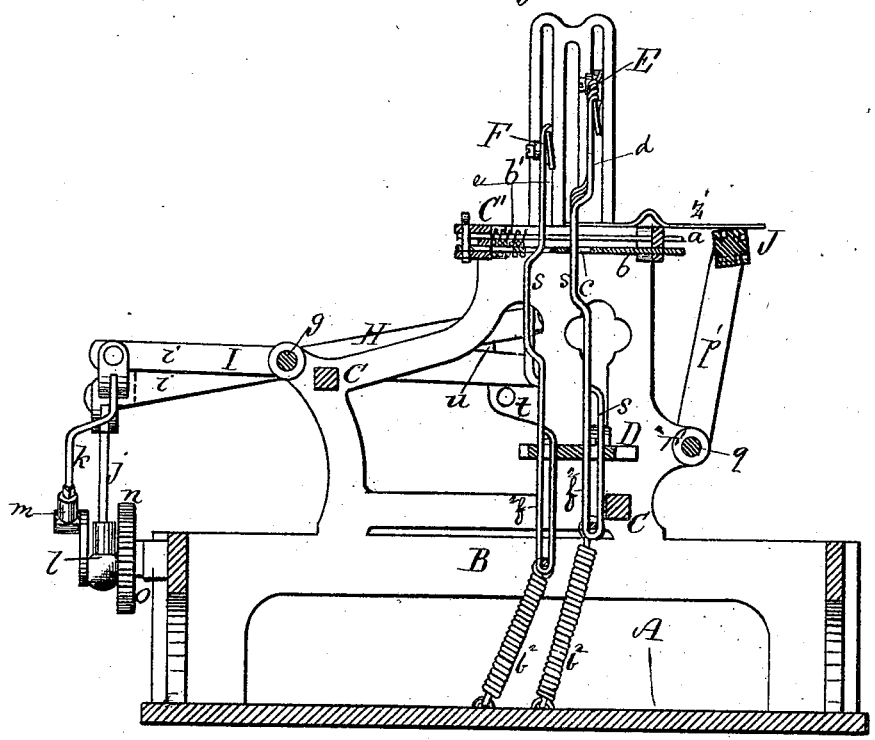
Figure 3:
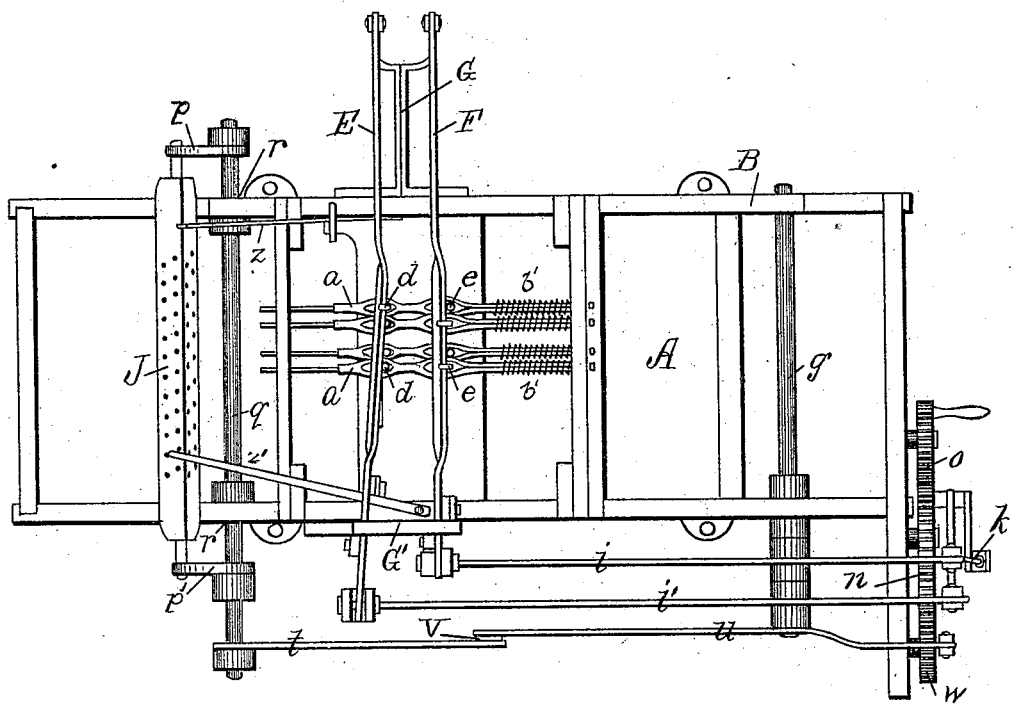
Figure 4:
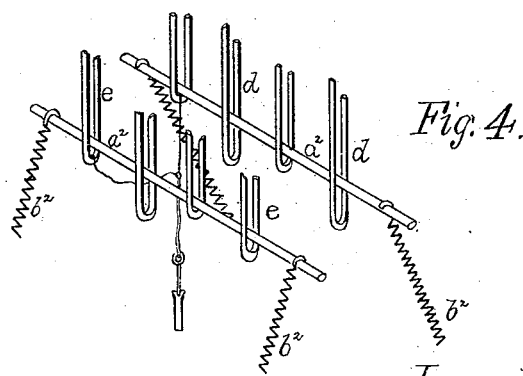

In the accompanying drawings, Figure 1 represents a perspective view of my improved shedding-engine. Fig. 2 represents a vertical longitudinal section through the same. Fig. 3 represents a plan view of said engine; and Fig. 4 represents a detail view of the lower looped ends of the hooks, with the rods and springs that act thereon.

A designates the base of the machine; B, the frame thereof; C C', cross-bars, and D a guide-plate, slotted to guide the lower parts of hooks $d$ and $e$, said lower parts being formed into loops, as shown in Figs. 1, 2, and 4. These hooks have the usual arrangement in two parallel series, one series being lifted by lever E and the other by lever F. Said levers are pivoted to links attached to a bracket, G. The said hooks are thrown off from said levers by needles $a\ b$ and cylinder J, which carries the pattern card or chain that operates on the ends of said needles in the usual manner. Each needle receives one hook of each series within one of its elongated loops or eyes $c$, and each hook is provided with an offset, $s$, which may move vertically through said eye or loop. When a hook is in its lowest position its offset $s$ is below the loop or eye $c$, and the needle will come into contact with said hook when forced back by the pattern-cylinder. When the hook is in its highest position, however, its offset $s$ is within said loop or eye $c$, and the needle will not come into contact with the hook. One hook may therefore be detached from its lever without moving or straining the other hook, which extends through the same needle. This construction is not substantially new, and I merely describe it to show clearly the working of the engine. Of course, however, my improvement hereinafter claimed may be used with a shedding-engine which has no offsets in its hooks and no elongated loops or eyes in its needles.

Pattern-cylinder J is supported by arms $p\ p'$ upon a rock-shaft, $q$, having bearings $r\ r$. Suitable friction-springs, $z\ z'$, bear against it and cause it to rotate when moving backward.

Motion is given to levers E F and rock-shaft $q$ as follows: The driving-wheel $o$ gears with a second wheel, $n$, which gears with a third wheel, $w$. On said wheel $n$ is a horizontal eccentrically-arranged stud, $m$, which carries a sleeve, one side whereof is formed into a second stud, $l$, at right angles to stud $m$. A pitman, $j$, extends from stud $l$ to a double-jointed link connected to the rear end, $i'$, of a lever, H, of the first kind, the other end whereof is connected by a rod, $f'$, to the proximate end of lever E. A rigid arm, $m'$, extends from the end of stud $m$ (turning therewith) in a direction parallel to the face of wheel $n$. The other end of said arm $m'$ carries a boss or stud, $m^3$, which has another boss or stud, $m^2$, formed upon its side. From said boss or stud $m^2$ a pitman, $k$, extends to a double-jointed link connected to the rear end of a lever, I, of the first kind, the other end of which is connected by a rod, $f'$, to the proximate end of lever F.

Wheel $w$ carries a stud having a boss or stud sleeved thereon, these parts being arranged like $l$ and $m$. A pitman or rod, $v$, extends from this second or branch stud to a double-jointed link connected to a lever, U, of the first kind, which operates through link V an arm, $t$, of rock-shaft $q$.

Levers H, I, and U are fulcrumed on a shaft or rod, $g$, and the pitmen $j\ k\ v$ have ball-and-socket connection to their respective operating-studs.

By means of the devices above described the rotation of wheel $o$ causes the levers E F to vibrate vertically, and the rock-shaft $q$ to rock as required for the proper operation of the machine.

Needles $a\ b$ are provided with the usual replacing-springs $b'$.

The vibrating ends $f\ f$ of levers E F are guided by slotted frame G'.

Of course the various actuating devices and details of construction above described may be greatly varied.

Two horizontal rods, $a^2$, are arranged in the loops $f^2$ of the lower ends of hooks $d$, one rod extending transversely through each series of loops. Springs $b^2$ draw said rods downward, they being attached to said rods, preferably at the end thereof, by their upper ends, and to the bed-piece of frame A at their lower ends. When either lever E or F descends from its highest position the hooks lifted thereby are drawn down with it by the action of the two springs $b^2$, which draw on the rod in the loops $f^2$ of said hooks. When the lever rises the hooks lifted thereby are held tightly upon it by the same action of the springs, so that accidental displacement is prevented.

Having thus described my invention, what I claim as new, and desire to secure by Letters Patent, is—

In a shedding-engine, the combination, with a lifting-lever and operating mechanism therefor, of a series of hooks having loops on their lower ends, a rod passed through all of said loops, and a spring or springs tending to force said rod downward, substantially as set forth.

In testimony whereof I affix my signature in presence of two witnesses.

GEORGE W. STAFFORD.

Witnesses:
  EDWARD O. BROWN,
  HERMANN OTTO.